United States Patent [19]

Egerer

[11] 4,245,384

[45] Jan. 20, 1981

[54] METHOD OF MAKING HEAT-INSULATED STRUCTURAL SECTION ASSEMBLIES

[75] Inventor: Rudolf Egerer, Bellenberg, Fed. Rep. of Germany

[73] Assignee: Wieland-Werke Aktiengesellschaft, Postfach, Fed. Rep. of Germany

[21] Appl. No.: 967,536

[22] Filed: Dec. 7, 1978

[30] Foreign Application Priority Data

Dec. 14, 1977 [DE] Fed. Rep. of Germany ....... 2755669

[51] Int. Cl.[3] .............................................. B23P 19/04

[52] U.S. Cl. ........................................ 29/433; 29/241; 29/243.5; 29/509; 49/DIG. 1; 52/403

[58] Field of Search .............. 29/433, 241, 509, 243.5; 49/DIG. 1; 52/403

[56] References Cited

U.S. PATENT DOCUMENTS

| | | | |
|---|---|---|---|
| 3,420,026 | 1/1969 | Nolan | 29/509 UX |
| 3,579,724 | 5/1971 | Toth | 52/403 X |
| 3,992,769 | 11/1976 | Jackson | 29/509 X |
| 3,999,354 | 12/1976 | Anter et al. | 29/509 X |
| 4,079,496 | 3/1978 | Schmidt | 49/DIG. 1 X |
| 4,096,678 | 6/1978 | Diels et al. | 49/DIG. 1 |
| 4,194,284 | 3/1980 | Diels et al. | 29/509 |

*Primary Examiner*—Charlie T. Moon

*Attorney, Agent, or Firm*—Ladas & Parry

[57] ABSTRACT

This invention relates to methods and apparatus for making heat-insulated structural section assemblies for use in window and door frames, and the like. The structural section assemblies consist of two structural metal sections transversely connected to each other by a pair of parallel, heat insulating bars spaced from each other and having longitudinal ends of swallow-tail cross-sectional shape which are successively received between pairs of longitudinally extending opposite grooves each defined by upper and lower flanges of said structural sections, whereby said pair of heat-insulating bars define an enclosed space, these grooves loosely receiving first one of said heat-insulating bars being closed upon said first heat-insulating bar by continuously pressing said upper flanges against said heat-insulating bar.

3 Claims, 5 Drawing Figures

METHOD OF MAKING HEAT-INSULATED STRUCTURAL SECTION ASSEMBLIES

BACKGROUND OF THE INVENTION

This invention relates to a method for making a heat-insulated structural section assembly for use in a window and door frames, consisting of two structural metal sections transversely connected to each other by a pair of parallel, plastic heat-insulating bars spaced from each other and having longitudinal ends of swallow-tail cross-sectional shape which are successively received between pairs of longitudinally extending opposite grooves each defined by upper and lower flanges in said structural sections, whereby said pair of heat-insulating bars define an enclosed space, in which method those grooves loosely receiving first one of said heat-insulating bars are closed upon said one heat-insulating bar by continuously pressing said upper flanges of the respective grooves against said one heat-insulating bar.

DESCRIPTION OF THE PRIOR ART

A method of the above type is disclosed in German patent application No. 2,559,599. In this method, the metal structural sections are preliminarily assembled so that they define the enclosed space together with the heat-insulating bars. After such preliminary assembly, the groove-defining flanges which are located in the area of the enclosed space are bent with a pulling mandrel and pressed onto the heat-insulating bars. The bending and pressing operations can be achieved only from the enclosed space. Where for constructional reasons the enclosed space is to be kept small, it is hardly possible, accordng to such prior method, to compensate the unavoidable tolerances in the manufacture of the structural sections and plastic heat-insulating bars. In unfavorable cases, there is produced a structural section assembly having insufficiently accurate dimensions for further treatment. In addition, it is difficult, with an enclosed space which is kept small, to bend and press the groove-defining flanges since a pulling mandrel having correspondingly small dimensions is required.

OBJECT OF THE INVENTION

The object of this invention is to improve the above prior art method so that an operable structural section assembly can be manufactured even where the enclosed space is small and the tolerances of the structural metal section are unfavorable.

SUMMARY OF THE INVENTION

In accordance with the invention, such object is achieved by a method comprising the following successive steps:

(a) the first received heat-insulating bar is longitudinally pulled between opposing grooves in said structural sections,
(b) those flanges which are adjacent to said enclosed space are firmly pressed by pressure rollers, in a single stroke, against said first received heat-insulating bar,
(c) the second received heat-insulating bar is longitudinally pulled in between the respective grooves of said structural sections, and
(d) those flanges which are remote from said enclosed space and correspond to said second received heat-insulating bar are firmly pressed by said pressure rollers against said second heat-insulating bar.

By using such method, the manufacturing tolerances cannot become added to each other, which would result in the described drawbacks. By way of example, should the heat-insulating bars, the groove-defining flanges of the structural sections and the outer dimensions of the bending tools be too large, then the finished structural section assembly would not be useable. A compensation cannot be achieved, as the bending step no more carried out in opposite directions, but rather the bending step is carried out only from a single direction. The pressure load on the groove-defining flanges in the direction of each heat-insulating bar of the pair can be arbitrarily controlled. Thus, a tolerance compensation is made possible in a simple manner.

In a preferred embodiment of the method according to the invention, the above steps (b) and (c) are carried out in a single operation. The second heat-insulating bar is introduced between the groove-defining flanges immediately after the first heat-insulating bar has been secured in place. Thus, one working step is eliminated.

The structural metal sections are preferably made of aluminum or aluminum alloy. However, other light-weight metals commonly used for making window and door frames are also suitable.

The heat-insulating bars may be made of any plastic having good heat-insulating characteristics, e.g. polyamides. Such plastics are well known to those skilled in the art.

The apparatus for carrying out the method of the invention essentially comprises a pair of pressure rollers disposed behind one another in the feeding direction, which are more vertically adjustable for applying pressure first against said first received heat-insulating bar and then against said second received heat-insulating bar, the axes of said pressure rollers being in a same plane which makes a right angle with the plane of the window pane to be set into the window or door frame.

In a preferred embodiment of the apparatus, the axes of the pressure rollers corresponding to the groove-defining flanges to be pressed against the heat-insulating bars are angularly disposed with respect to each other.

In a further preferred embodiment of the apparatus, permitting to combine the above steps (b) and (c) in a single operation, the apparatus also includes a stationary suspension device immediately downstream of the pair of pressure rollers.

In a still further preferred embodiment of the invention, said suspension device consists of:

(a) at least one pair of oscillating arms each provided with a gripping plate, which are resiliently biased towards said second received heat-insulating bar,
(b) at least one pair of abutment rollers which are fastened to said oscillating arms and are mounted on said gripping plates, and
(c) a pulling device, in the form of a cable and a pin, for attachment to said second received heat-insulating bar and maintaining the latter in the axial direction.

The invention will now be described in further detail with reference to the accompanying drawings showing a preferred embodiment thereof.

DETAILED DESCRIPTION OF THE DRAWINGS

Figure 1:
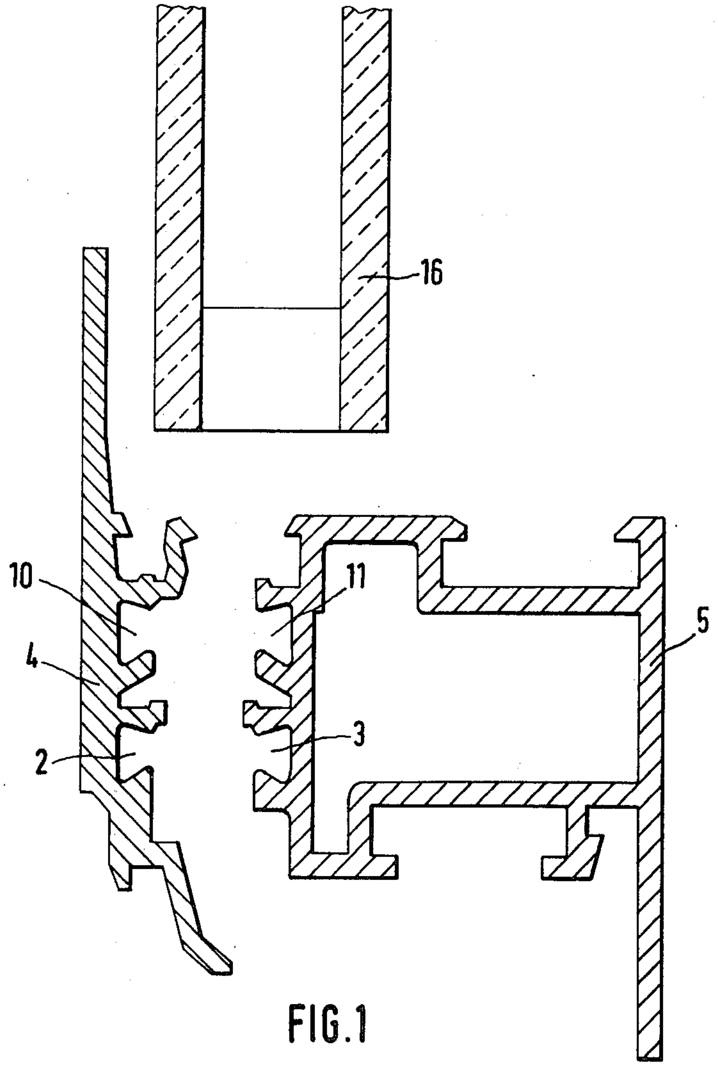
FIG. 1 shows the two structural metal sections in cross-sectional view, together with a window glazing to be set therebetween before the heat-insulating bars are received in the grooves.
Figure 2:
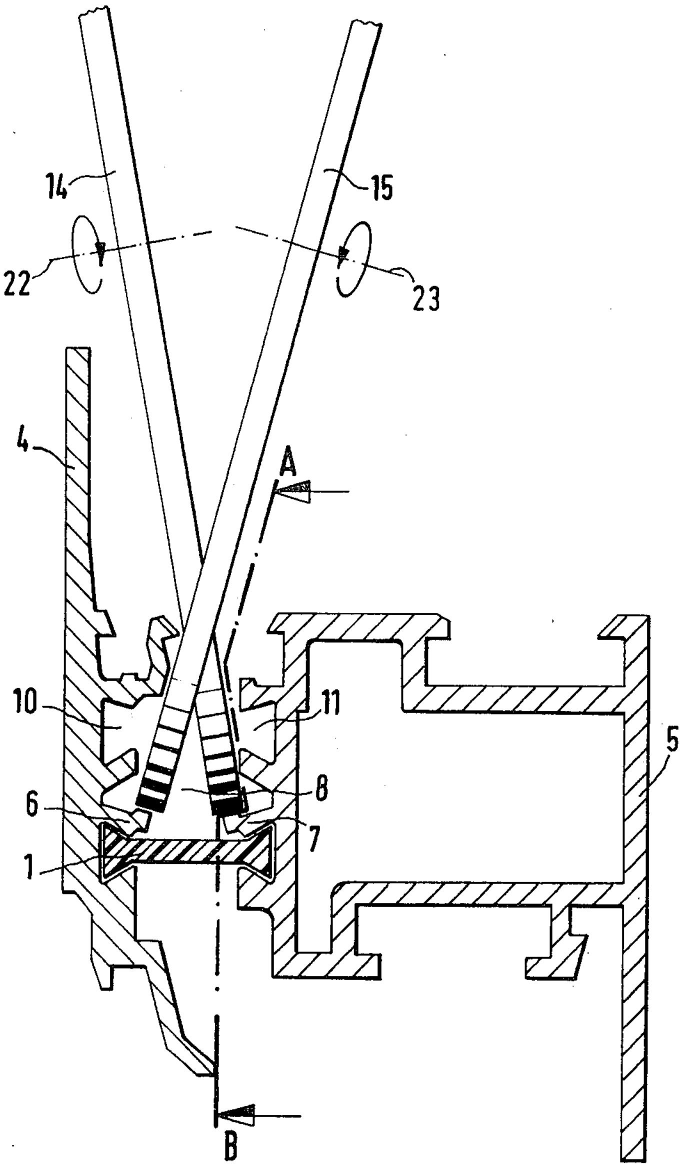
FIG. 2 is a view similar to FIG. 1, showing how the lower heat-insulating bar is being secured in place by the pressure rollers.
Figure 3:
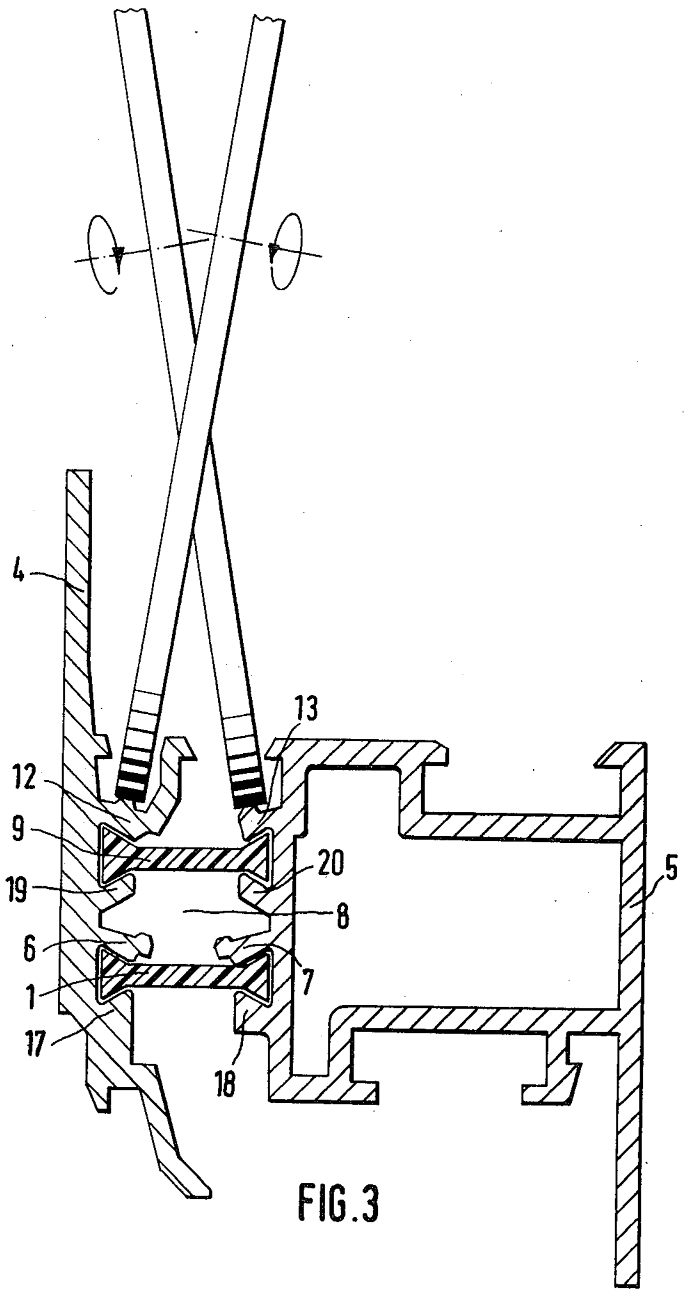
FIG. 3 is a view similar to FIG. 2, in which the upper heat-insulating bar is being secured in place by the pressure rollers.

In FIG. 2, a first lower heat-insulating bar 1 is shown in position in grooves 2, 3 (FIG. 1) of structural metal sections 4, 5. Thereafter, flanges 6 and 7 which define the upper walls of the grooves 2 and 3 are bent down and firmly pressed against the first heat-insulating bar 1 in a single stroke by pressure rollers 14 and 15. As shown in FIGS. 2 and 3, the flanges 6 and 7 are located adjacent to an enclosed space 8 defined by the first (lower) heat-insulating bar 1 and a second (upper) heat-insulating bar 9 and by the two structural sections 4 and 5. The rolling step is carried from the direction in which a window pane 16 (shown in FIG. 1) is to be later set in the window frame, i.e. from above in the illustrated embodiment.

The second heat-insulating bar 9 is then longitudinally pulled into corresponding grooves 10 and 11 (FIG. 1) of the metal sections so that the arrangement shown in FIG. 3 is obtained. In the next step, flanges 12 and 13 defining the upper walls of grooves 10 and 11 are bent down and firmly pressed against the second heat-insulating bar 9 by pressure rollers 14 and 15. This rolling step is again carried out from the location of the window pane to be later set. As shown in FIG. 3, the flanges 12 and 13 are not adjacent to the enclosed space 8 but are remote therefrom. Flanges 17, 18, 19 and 20 which define the lower walls of grooves 2, 3 and 10, 11 respectively are not deformed and are pressed only indirectly against the respective heat-insulating bars 1 and 9. In fact, flanges 17 to 20 are out of the rolling direction.

In the whole working process, the rolling operation takes place from a single direction, i.e. from above in the illustrated embodiment.

As the method can be carried out with pressure rollers having large diameters, high operating speeds can be achieved.

On the other hand, where an extremely high operating speed is not desired, the rolling steps can be carried out in a single operation. That is, the second heat-insulating bar 9 is brought into the corresponding grooves 10, 11 by longitudinally pulling it thereinto immediately after the first heat-insulating bar 1 has been secured in place.

The apparatus for carrying out the method of the invention essentially consists of a pair of pressure rollers 14, 15 which are disposed one behind the other in the feeding direction and which have their axes in a same plane perpendicular to the general plane of the window pane to be set in the window frame, and cooperate with corresponding back-up rollers 24 (FIG. 4) upon which acts the force exerted by pressure rollers 14, 15.

In the illustrated preferred embodiment of the invention, the axes 22, 23 of pressure rollers 14, 15 corresponding to the flanges 6, 7 to be rolled are not in the same plane but are rather slightly angularly offset with respect to each other so that the pressure rollers can be passed between the flanges 12, 13 and 19, 20 without damage thereto. For applying pressure to flanges 6 and 7 so as to force them against the first heat-insulating bar 1, the pressure rollers 14 and 15 are vertically adjusted and are located lower or deeper than when applying pressure to flanges 12 and 13 to force them against the second heat-insulating bar 9.

In order to combine the above steps, a special device is required in the form of a stationary suspension device which is disposed immediately downstream of the pair of pressure rollers 14, 15, and to which the second heat-insulating bar 9 is attached. The suspension device consists of members 25, 26, 27, 28 and 29 shown in FIGS. 4 and 5 and described hereinbelow, FIG. 4 partially being a cross-sectional view along line A–B of FIG. 2.

Figure 4:
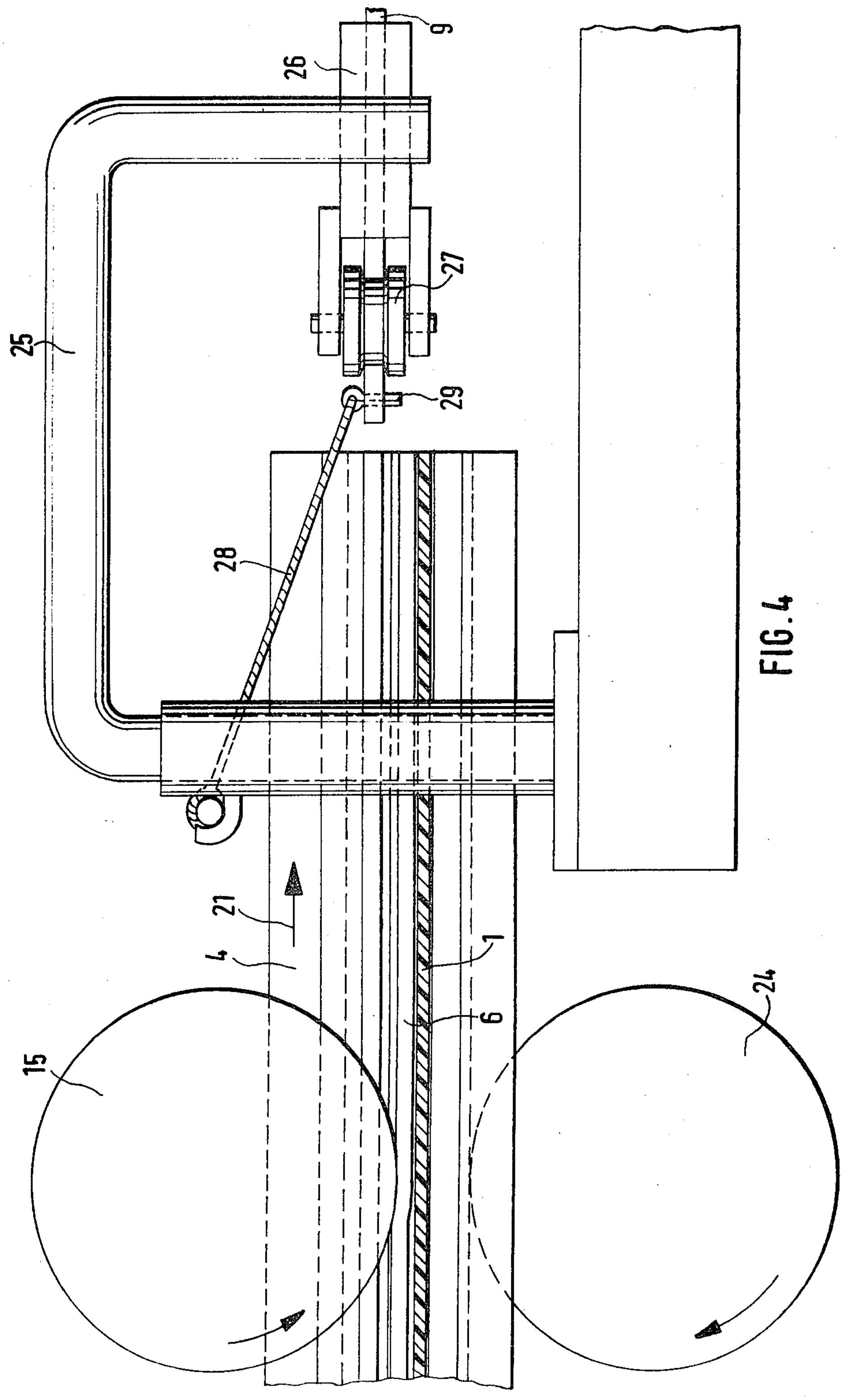
FIG. 4 is a cross-sectional view taken along line A–B in FIG. 2, also showing a suspension device.
Figure 5:
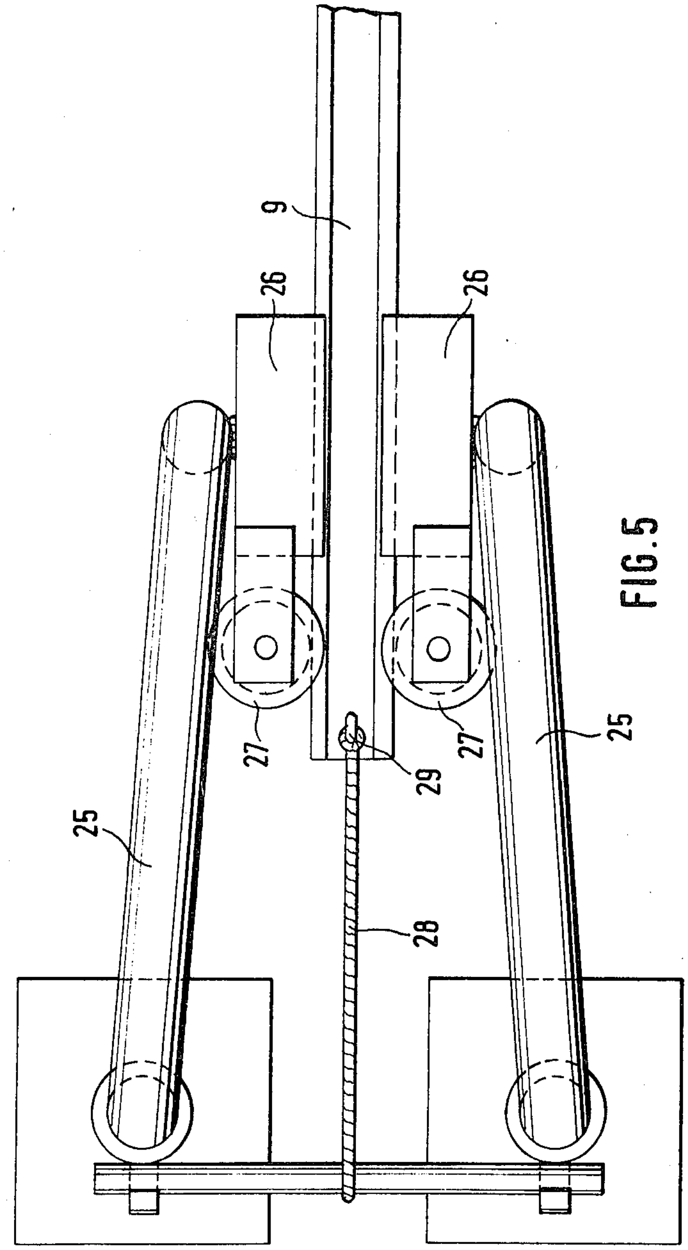
FIG. 5 is a plan view of the suspension device shown in FIG. 4.

The pressure roller 15 bends the flange 6 while the structural sections 4 and 5 are moved in the feeding direction, shown by arrow 21 in FIG. 4, together with the first heat-insulating bar 1 which has previously been secured in place. The second pressure roller 14 which disposed either before or behind the first pressure roller 15, is not shown in FIG. 4. The back-up roller 24 takes up the back pressure. The second heat-insulating bar 9 is held over a pair of oscillating arms 25 by a pair of respective gripping plates 26 (FIG. 5). Each gripping plate is attached to one end of the corresponding oscillating arm 25. The gripping plates 26 are adapted to hold the second heat-insulating bar 9 exactly in the position in which it can be introduced into the grooves 10 and 11 upon passage of the structural metal sections 4 and 5 through the suspension device. The structural metal sections 4 and 5 engage abutment rollers 27 attached to the oscillating arms 25. Thus the oscillating arms 25 which are resiliently biased towards each other are pushed away from each other with the gripping plates 26 disposed downstream of the abutment rollers 27, so that the structural sections 4 and 5 can pass beyond the suspension device. From this stage on, the second heat-insulating bar 9 is held up only by a cable 28 which is firmly secured by means of a pin 29 with the second heat-insulating bar 9. The cable 28 and pin 29 take up the pulling force which results from sliding movement of the structural sections 4 and 5 over the second heat-insulating bar 9. In such position, the first heat-insulating bar is finally secured into the grooves 2, 3 and the second heat-insulating bar 9 is longitudinally pulled into the corresponding grooves.

I claim:

1. A method for making structural section assemblies for window and door frames, the assembly consisting of two structural metal sections transversely connected to each other by a pair of parallel, spaced heat-insulating bars received between opposing pairs of longitudinally extending grooves defined by upper and lower flanges in said structural sections, whereby said pair of heat-insulating bars define an enclosed space, in which method the grooves loosely receiving first one of said heat-insulating bars are closed upon said first heat-insulating bar by continuously pressing the upper flanges against said first heat-insulating bar, wherein said method comprises the following successive steps:

(a) the first received heat-insulating bar is longitudinally pulled in between grooves in said structural sections;

(b) the flanges which are adjacent to said enclosed space are firmly pressed by pressure rollers, against said first heat-insulating bar;

(c) a second heat-insulating bar is longitudinally pulled between opposing grooves in said structural sections; and (d) the flanges which are remote from said enclosed space and engage said second heat-insulating bar are firmly pressed by said pressure rollers against said second heat-insulating bar.

2. A method as claimed in claim 1, wherein said steps (b) and (c) are carried out in a single operation, said second heat-insulating bar is introduced between said grooves immediately after said first heat-insulating bar has been secured in place.

3. A method according to claim 1, wherein the structural sections are made from a metal selected from the group consisting of aluminum and aluminum alloy.

* * * * *